(12) United States Patent
Smith et al.

(10) Patent No.: US 8,260,699 B2
(45) Date of Patent: Sep. 4, 2012

(54) METHOD AND SYSTEM FOR MANAGING SPENDING THROUGH ACCOUNT ALLOCATION

(75) Inventors: Steven B. Smith, Holladay, UT (US);
Nicholas A. Thomas, Orem, UT (US);
Warren M. Rosner, South Jordan, UT (US)

(73) Assignee: Finicity Corp., South Jordan, UT (US)

( * ) Notice: Subject to any disclaimer, the term of this patent is extended or adjusted under 35 U.S.C. 154(b) by 1365 days.

(21) Appl. No.: 09/870,142

(22) Filed: May 30, 2001

(65) Prior Publication Data
US 2002/0010612 A1    Jan. 24, 2002

(51) Int. Cl.
*G06Q 40/00* (2012.01)
(52) U.S. Cl. ........................ 705/36
(58) Field of Classification Search ............... 705/35–45
See application file for complete search history.

(56) References Cited

U.S. PATENT DOCUMENTS

| | | | |
|---|---|---|---|
| 5,745,706 A | 4/1998 | Wolfberg et al. | 395/235 |
| 5,799,286 A | 8/1998 | Morgan et al. | 705/30 |
| 5,842,185 A * | 11/1998 | Chancey et al. | 705/40 |
| 5,857,079 A * | 1/1999 | Claus et al. | 705/33 |
| 5,903,881 A | 5/1999 | Schrader et al. | 705/42 |
| 6,064,990 A * | 5/2000 | Goldsmith | 705/75 |
| 6,128,603 A | 10/2000 | Dent et al. | 705/40 |
| 6,343,279 B1 * | 1/2002 | Bissonette et al. | 705/41 |
| 6,446,048 B1 * | 9/2002 | Wells et al. | 705/35 |
| 7,050,997 B1 * | 5/2006 | Wood, Jr. | 705/36 R |
| 7,797,207 B1 * | 9/2010 | Dilip et al. | 705/35 |
| 2002/0174006 A1 * | 11/2002 | Rugge et al. | 705/10 |

OTHER PUBLICATIONS

Carolyn M Brown. "Using your PC to manage your finances." Black Enterprise. New York: Jul 1997. vol. 27, Iss.12; p. 103 (5 pages).*
Business Editors, High-Tech Writers Summer Internet World 99. "PocketCard Inc.'s Product Launch at Internet World Summer 99; High-Tech VISA Card Ends Expense Account Headaches." Business Wire. New York: Jul. 21, 1999. p. 1 (3 pages total).*
Editors, Business Editors, High-Tech Writers Summer Internet World 99. "PocketCard Inc.'s Product Launch at Internet World Summer 99; High-Tech VISA Card Ends Expense Account Headaches." Business Wire. New York: Jul. 21, 1999. p. 1.*
Jane E. Chidester, John L. Macko, Budget Yes!, book, 1997, Tulip Tree Press, Powell, Ohio.
Michael T. Ramey, Envelope Budget, CD, Oct. 1, 1998 (version 1.0), Aug. 18, 2002 (version 2.0).
http://www.envelopebudget.com/ebhelp.htm, Copyright 2001, (last accessed Oct. 31, 2007).

* cited by examiner

*Primary Examiner* — Charles Kyle
*Assistant Examiner* — Clifford Madamba
(74) *Attorney, Agent, or Firm* — Kirton McConkie; Michael F. Krieger; Adam D. Stevens

(57) ABSTRACT

A method and apparatus are disclosed that provide for automated financial resource allocation and accountability among various groups of budgeted accounts, which are overlaid on at least one actual account. The method provides for the user to establish the accounts to be budgeted. The user then establishes a preset spending allocation amount for each account. Each time the user makes a spending allocation for that particular account, the account reflects the amount spent and notifies the user of the remaining amount allocated for that account during a given period. Thus, the user has a more accurate accounting of an established budget with respect to the established accounts, the resources allocated to each account, and the funds actually spent from each account.

9 Claims, 8 Drawing Sheets

```
GROCERIES:              PERIOD: MARCH, 2000              48

VARIABLE:         FIXED:
AMOUNT SPENT:   $XXX.XX
AMOUNT ALLOCATED:  $YYY.YY
REQUIRED:         DISCRETIONARY:

SUB ACCOUNTS:
    FOOD:  $357.88
    EATING OUT:  $75.00
    NON-FOOD ITEMS:  $100.00
    MILK DELIVERY:  $50.00
    BUTCHER DELIVERY:  $75.00

PAYMENTS REGISTERED:
    JONES' GROCERY:  $NNN.NN  DATE: 3/25/00
    BROWN'S CATERING:  $MMM.MM  DATE: 3/30/00
```

METHOD AND SYSTEM FOR MANAGING SPENDING THROUGH ACCOUNT ALLOCATION

RELATED INFORMATION

The present patent application is based on U.S. Provisional Application No. 60/198,961 filed Apr. 13, 2000, hereby incorporated by reference.

BACKGROUND OF THE INVENTION

The present invention relates generally to computer-based money management systems for users and, more particularly, to the management of financial resources through the allocation of resources to defined accounts in an automated, computer-based system.

Financial accounting is well-known to those skilled in the art. Accountants have been used by individuals and businesses to manage financial resources over the years. The development of the personal computer for every day use has allowed the simplification of personal and business accounting by a user. Such financial accounting programs include Quicken® by INTUIT, of Menlo Park, Calif., and Money® by Microsoft, of Redmond, Wash. These programs are well-known and provide the every day user with simple yet robust accounting means for tracking one's financial resources.

For example, both Quicken® and Money® offer account management services for managing one's checking account, savings account, and money market funds. These services also provide a user the ability to perform on-line banking services with their respective financial institution. Thus, utilizing either of these programs, a user can provide bill paying options and account recordation of transactions performed by the bank without having to receive an end-of-month financial statement from the financial institution. This allows the user to keep an up-to-date record of his or her financial transactions. These transactions can include checks written, credit card bills paid, deposits to retirement accounts, automatic bill payment options, and the like.

Both these programs also provide a rudimentary budgeting system that allows a user to see where his or her money is invested or spent. A user can establish his or her own budget, which may be followed for financial discipline; however, the resources used to cover the budget typically are drawn from a single source or a few sources of revenue. An end of period, such as week, month, quarter, year, statement is provided for how that revenue had been allocated for different groups of financial interests to generate a budget allocation after funds have been drawn from but one or two sources. Thus, a user can establish a budget to follow, but the discipline of having a budget is not felt until a reconciliation of funds distributed during a given period is made with an accurate accounting of payment and distribution is done. Only then does the user see whether he or she has been disciplined enough to follow the budget. This is because current budgeting system fail to allocate resources in a manner that forces the user to use the budget and achieve financial discipline.

Accordingly, what is needed is an automated resource and financial allocation system that instills greater financial discipline upon a user when desiring to follow a given budget prepared either by the user or by another in behalf of the user.

BRIEF SUMMARY OF THE INVENTION

According to the present invention, a method and apparatus are disclosed that provide for automated financial resource allocation and accountability among various groups of budgeted accounts. The method provides for the user to establish the accounts to be budgeted, which accounts are overlaid an actual monetary account. The user then establishes a preset spending allocation amount for each account. Each time the user makes a spending allocation for that particular account, the account reflects the amount spent and notifies the user of the remaining amount allocated for that account during a given period. Each time a user receives cash it is deposited to these specific accounts in a manner that reflects the preset spending allocations set by the user. Thus, the user has a more accurate accounting of an established budget with respect to the established accounts, the resources allocated to each account, and the funds actually spent from each account. The method is operable in a computer environment such as a personal computer, a laptop computer, a personal digital assistant (PDA), mobile phones, smart phones, or other computer systems that have a central processing unit, memory means, input and output means, and optional data communication means for connecting to the internet, a financial institution system, or the like.

The method and system also provide the user the ability to manage various accounts in a real time and automated manner, as well as to retrieve financial transaction information from a financial institution, which provides accurate, up-to-the-minute information with respect to payments authorized, checks cleared, and contributions made. The method and system also provide the user the ability to make on-line payments for bill payment and the like. The user can allocate the bill payments from the various accounts established so that the user is aware of the allocation of resources amongst the accounts for accurate budget keeping.

The present invention describes a method and system, which are implemented on a computer system, that enables users to make proactive spending decisions by forming an environment where the user spends from traditional "expense" accounts as though they were individual spending or bank accounts. Thus, when a user receives funds, such as cash, the user allocates those funds by depositing them into user defined spending accounts or envelopes.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE PREFERRED EMBODIMENTS

It will be readily understood that the components of the present invention, as generally described and illustrated in the figures herein, could be arranged and designed in a wide variety of different configurations. Thus, the following more detailed description of the embodiments of the system and method of the present invention, and represented in FIGS. 1 through 9, is not intended to limit the scope of the invention, as claimed, but is merely representative of the present embodiments of the invention.

The present embodiments of the invention will be best understood by reference to the drawings, wherein like parts are designated by like numerals throughout.

The present invention describes a method and system that is implemented on a computer system to enable users to make proactive spending decisions by forming an environment where the user spends from traditional "expense" accounts as though they were individual spending or bank accounts. Thus, when a user receives funds, such as cash, the user allocates those funds by depositing them into user-defined spending accounts or envelopes. When funds are spent, the user spends from defined spending envelope. This allocation enables the user to see in real time the impact of current spending and saving according to the budget established. Thus, once the user sees that the funds are nearly exhausted for a given account, the user can then reign in his or her spending consistent with the established budget based on available funds for the envelope.

The method and system are intended to operate in a personal computer environment, which environment not only includes desk top computer systems, but also lap tops, palm-sized PC's, personal digital assistants (PDAs), mobile phones, smart phones, or by access through an ISP. Data can then be synchronized to a secure central data storage site on the internet where that data can be accessed, previous transactions viewed, and where transactions can be made or allocated by any wire or wireless device with multiple simultaneous connections to the same centralized data. The method and system provide the user the ability to interact with on-line financial institutions, which include banks, investment groups, and credit organizations with either direct hands-on interaction or in an automated fashion defined by the user.

Figure 1:
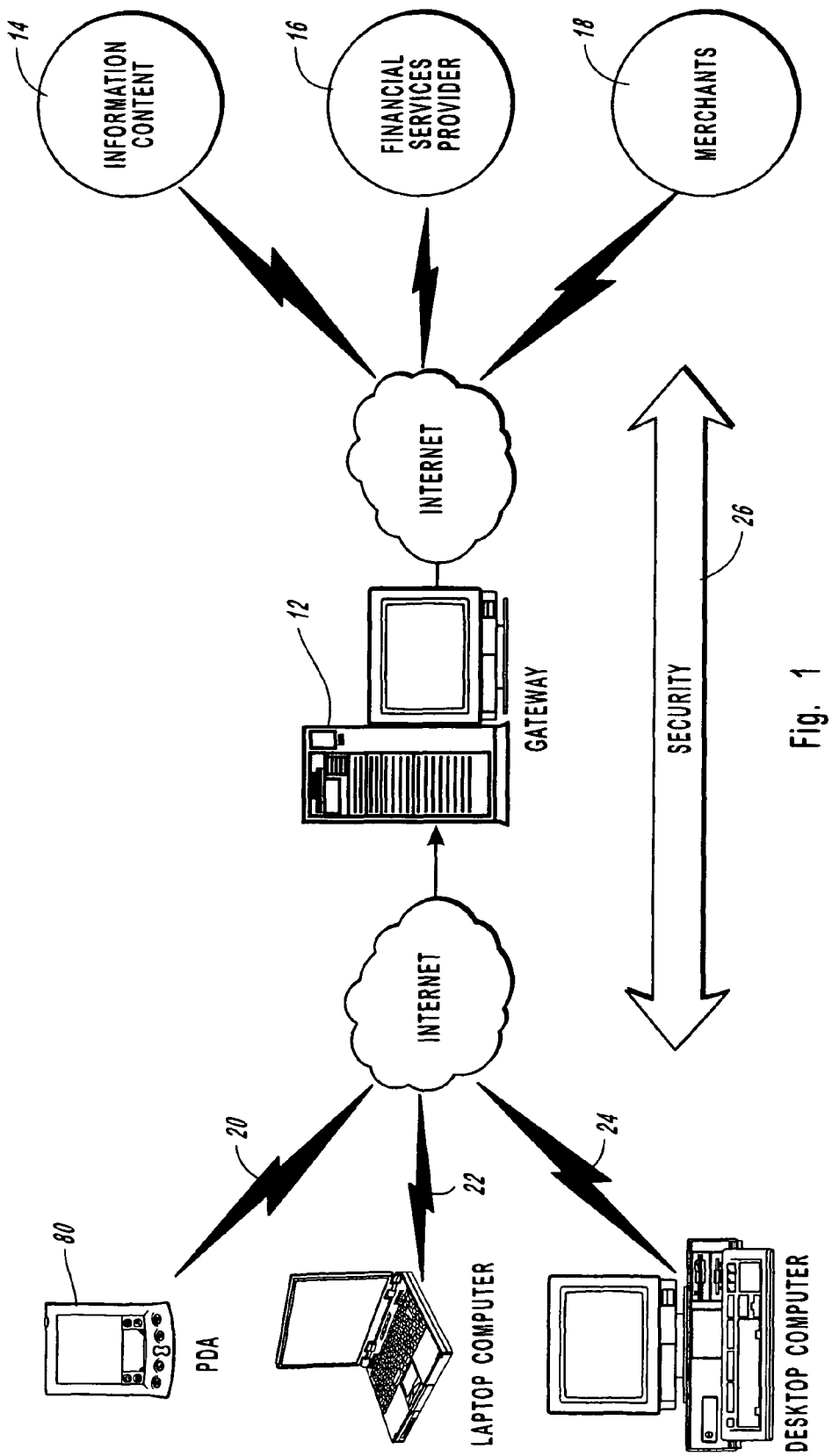
FIG. 1 illustrates a computer enterprise in which the present invention operates.

In a comprehensive system, a secure internet infrastructure, such as that illustrated in FIG. 1, is provided. The structure includes a provider gateway 12, which typically is a robust computer system typically used for managing web interaction and internet access and communication in a commercial setting. Such systems are well known to those skilled in the art. The gateway 12 provides two-way communication between a user and a further content destination such as an information contents source 14, financial service providers 16, and on-line merchants or off-line merchants via bill paying as illustrated as merchants 18. The user can connect to gateway 12 via either a wireless means 20, a direct connection wireline 22, or a cable modem or other cable-type connections 24. A security means 26 is provided so that the transactions provided by either the user on one side of the gateway or to the content providers on the other side of the gateway are secure at all times. At any time, the user can be offline and perform any transaction required or desired and then synchronize the transaction(s) when on-line so that it will be executed and performed. The system is intended to provide a user with the ability to manage his or her own spending accounts with various features. These features include having automated expense categorization, tracking, and trimming. The features also include automatic bank and credit card account tracking and reconciliation in conjunction with the accounts managed, as well as automatic on-line bill pay from the various expense categorizations. Another feature includes on-line bill presentment where desired, as well as e-mail payment ability, point-of-sales tools, personal credit card processing tools, and automatic report generation.

The system is designed to operate in a graphical user interface mode where the user can manipulate data and information via such pointing devices as a mouse or roller ball, with keyboard entry also being provided, among others. As such, the system is typically designed to be operated within a Windows-type, MAC, JAVA, HTML, EPOC, etc., operating environment that can be readily implemented by those skilled in the art. Browsing devises use JAVA or HTML; others use resident Operating Systems.

During the initial account set-up, the user determines what type of tracking set-up is to be established. The user can select either an auto track set-up or a full track set-up. The auto track set-up performs activities in an automated fashion on behalf of the user as previously defined. The full track set-up allows the user to set up on-line bill payment as well as the ability to manipulate any default category available in the auto set-up mode. The full track set-up also allows the user to manipulate the default category settings that are typically found in the auto track set-up and allows the user to start tracking account expenses to some date prior to the date of set-up. In the auto track set-up mode, default category settings are established that are based upon balances received during an on-line or set-up entry interview with the user to establish starting balances. In the auto track mode, the account tracking activity begins as the day of set-up. The system proceeds to interview the user to provide information such as name, address, type of program or accounts to be utilized, home address, home phone number, fax numbers, and E-mails. Further, an on-line provider information is secured so that the user can use on-line communication tools to access on-line content providers as shown in FIG. 1.

Next, the user establishes the types of accounts to be tracked. These types of accounts are illustrated in the block diagram of FIG. 2. These accounts include a personal checking account 40, a personal savings account 42, various retirement accounts grouped together in retirement accounts 44, housing account 46, groceries account 48, credit accounts 50, recreation account 52, clothing account 54, utilities account 56, auto expense account 58, investment accounts 60, and gift accounts 62 and any other the user spending accounts desired. Such additional accounts can include personal brokerage investment and personal insurance accounts. These various accounts can be defined by the user with more or less accounts actually being established. It is not intended that these accounts be limiting with respect to the implementation of the invention, but are merely illustrative of what types of accounts are possible. It is important to note that these accounts can be actual (such as banking and checking) or virtual such as the clothing and car expense accounts. The actual accounts reflect actual dollars in those accounts, while the virtual accounts reflect a hypothetical apportionment of an actual account. Both types of accounts may be utilized at the same time, with the virtual accounts being automatically reconciled with the actual accounts.

When establishing an account, such as, for example, a personal checking or savings account, the user is interviewed to select the institution in which the account is held, provide an account friendly name, such as my checking account or our joint checking account, including a starting balance, a start date, and any on-line user name and password information that facilitates the on-line communication between the financial institution and the user. Similar procedures are utilized for establishing other accounts personal credit card accounts, personal retirement accounts, personal brokerage investment accounts, and the personal insurance accounts as an option. In each case, an account number or provider, starting balances, start dates, user names and passwords are provided during this interview procedure. Once the interview procedure is completed, the user can return to modify any of these accounts or add any additional accounts that may be desired. The system and method are flexible for allowing the user to make such modifications so that changes can be readily made and integrated according to the user's desires.

Figures 2, 3:
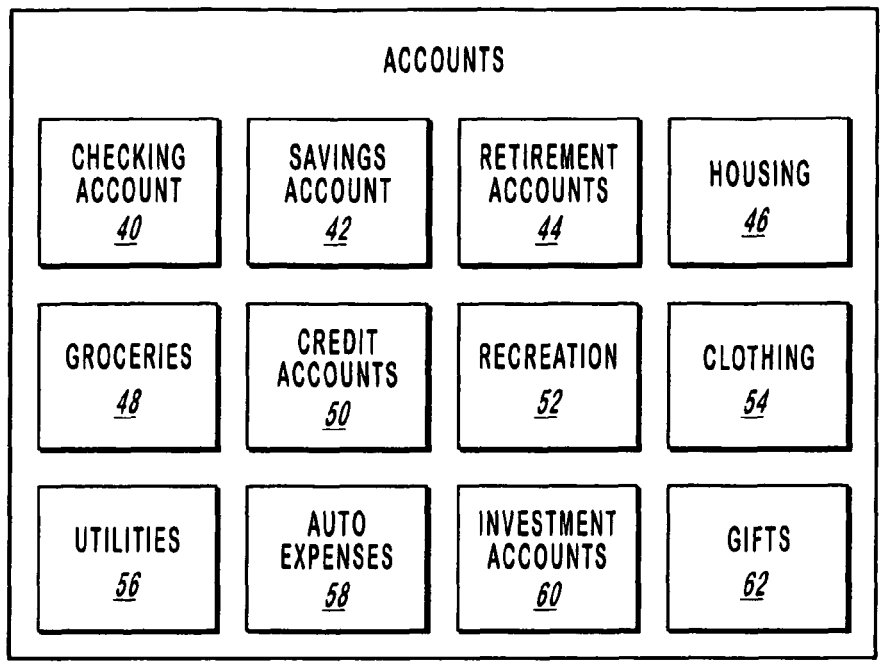
FIG. 2 illustrates a block diagram of a plurality of accounts established by a given user in accordance with the present invention.
FIG. 3 illustrates a block diagram of a given account selected from FIG. 2 detailing the financial information organized in accordance with the present invention.

Next, the user is able to establish various personal bank accounts known as expense envelopes, one of which is illustrated in FIG. 3 and is labeled GROCERIES. The expense envelopes can be established to serve as a budgeting means for following a personal budget desired by the user. The account is established with a current available account balance as well as with expected inflows. Next, the user defines whether the envelope is to cover fixed required expenses at fixed intervals, such as on-line bill payment, or whether it is variable required expenses at fixed intervals, variable required expenses at variable intervals, such as credit/debit or other on-line bill pays, or variable discretionary expenses at variable intervals for expenses that cannot be routinely predicted. For each account as shown in FIG. 2, the user goes through and defines the envelopes within those accounts. For example, multiple checking accounts may be utilized with one envelope or many envelopes for each account. Likewise, for the savings accounts, the user would establish how many envelopes are desired for the number of accounts established.

The account envelopes, such as the one shown in FIG. 3, allow the user to manage discretionary spending in a more detailed and concise way. For example, in FIG. 3, the GROCERIES account has been selected and a budgeting period, for example March, 2000, has been established. The period can be any defined period desired by the user, such as daily, weekly, monthly, quarterly, yearly, or any other selected period. The user, when setting up the account, defines whether this account is a variable expense or a fixed expense account. Since groceries typically vary in a nominal way, it can be selected as a fixed account, such as when the user has a buying relationship with a particular grocer who follows a purchase list and delivers the groceries to the user for a fixed rate. Otherwise, the user typically goes to the grocery store and makes the desired purchases and then enters the information in the account system at a later time. The user may or may not know the expenses on a monthly basis that are incurred in securing food and other grocery items. As such, the user may select this as a fixed account or a variable account. The user then provides an Amount Allocation as shown in FIG. 3. The amount allocated is then the ceiling to which the user is able to draw from this account. The account shows the ongoing cash balance in the account. The account also shows how much is actually spent in the Amount Spent field.

Groceries can also be defined as hybrid accounts such that they are required, but are often allowed discretionary purchases. As such, this would be a hybrid that the user would select. Selective sub-accounts are shown in the Sub-Accounts field and these can include such fields as food, eating out, non-food items, milk delivery, butcher delivery, and any other discretionary sub-account desired by the user to reflect the user's life style and purchasing spending habits. In this example, it is shown that each of the sub-accounts has incurred a certain expense for the month. This allows the user to see where the spending habits are so that appropriate lifestyle changes may be made if the spending is above budget. Further still, the account allows the user to provide on-line payment and is represented by the Payments Registered field as shown in FIG. 3. In this example, the user has a payment to Jones Grocery on March 25, and a second one to Brown's Catering on March 30. These payments will be made via the appropriate financial institution, but the funds will be allocated to the Groceries account rather than to the general checking account.

Each account of FIG. 2 has a similar field that has the Amount Allocated field as well as the Amount Spent field. This allows a user to select from the particular envelope during the budgeting procedure so that the user is forced to conform to the budget established by the user in an attempt to instill financial discipline upon the user.

Each account, as well as each and all sub-accounts within a given account, can be modified according to the user's discretion. Thus, if the user finds that he or she has greater financial resources than previously entered, then discretionary increases can be made in each allotted amount. On the other hand, if the user suffers a financial setback, then the user can manage the budget and amount allocated for a particular field so that better control of one's financial resources is achieved.

There are certain accounts that typically are fixed in relation, these accounts include housing costs, and auto loan payments. It is rare that these accounts would be manually managed so they are typically set up to be paid in an automated fashion with resources being allocated directly from the paycheck or other sources of income that the user has in order to fund these accounts. Other accounts would have greater needs for discretion and real time management, which would include the retirement accounts, the investment accounts, and other day to day credit accounts and such.

Figure 4:
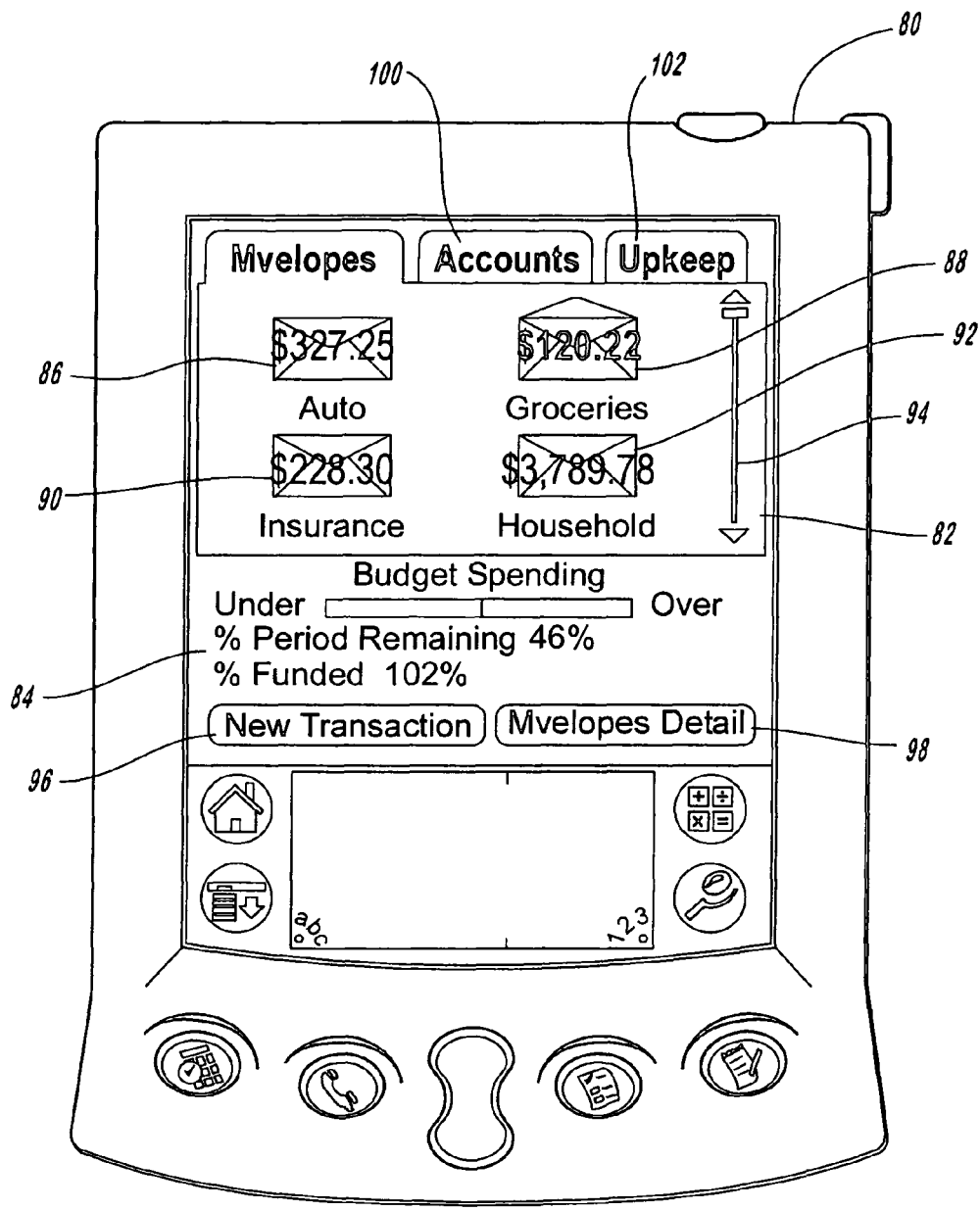
FIG. 4 illustrates an information window view on a PDA of money envelopes in accordance with the present invention.

In an alternative or complementary example shown in FIG. 4, the envelopes are shown in use on a personal digital assistant (PDA) device 80, which has a viewing window 82 to display information for the user. Viewing window 82 also is a touch screen panel that allows the user to directly access a particular envelope with a stylus. Additional information is provided in graphical form to convey budget information. For example, a budget spending bar 84 is shown to illustrate what percentage of the budget has been spent. Each envelope, such as an Auto envelope 86, a Groceries envelope 88, an Insurance envelope 90, and a Household envelope 92 show the available balance remaining on the icon representation of the same. Additional envelopes are shown upon scrolling up or down the window via scroll bar 94. When the user selects an icon, envelope summary information is then displayed, such as that shown in FIG. 3 and FIG. 5. The user can also select to enter a new transaction via transaction icon 96 or select envelope detail via envelope icon 98.

Not only are money envelopes available, but the interface also allows the user to access other accounts via accounts folder 100. Further, upkeep options are available through upkeep folder 102.

Figure 5:
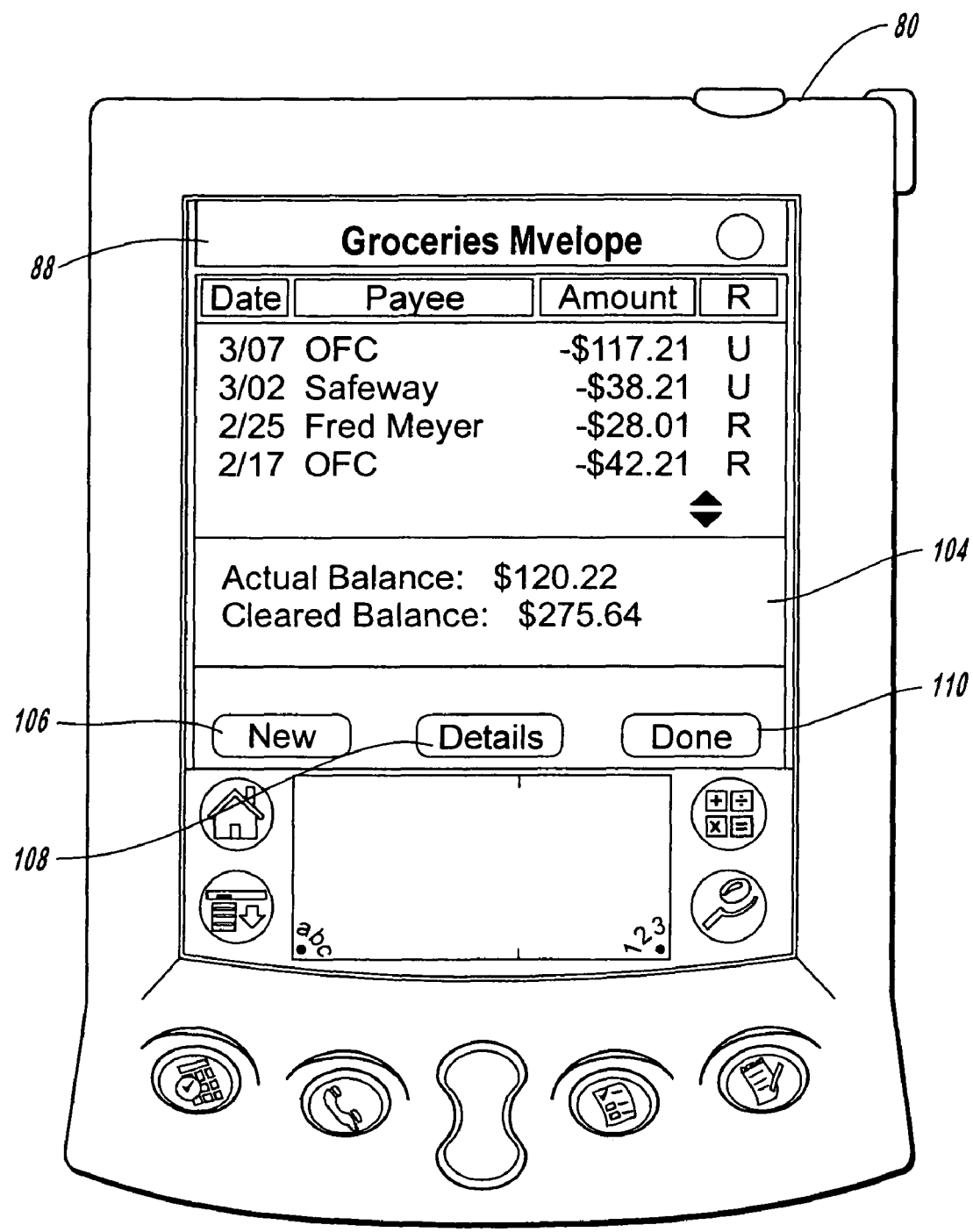
FIG. 5 depicts an information window of a money envelope selected in FIG. 4 in accordance with the present invention.

FIG. 5 illustrates a detail screen 104 for a selected money envelope. In this example, the Groceries money envelope 88 has been selected. The information displayed includes specific transactions as well as an actual balance total and a cleared balance total. The specific transactions include date entered, payee name, amount of transaction, among others. The user can select the new icon 106 to enter a new transaction, the details icon 108 to view or edit more details of a given transaction, or the done icon 110, to close the envelope and return to the view of FIG. 4.

Figure 6:
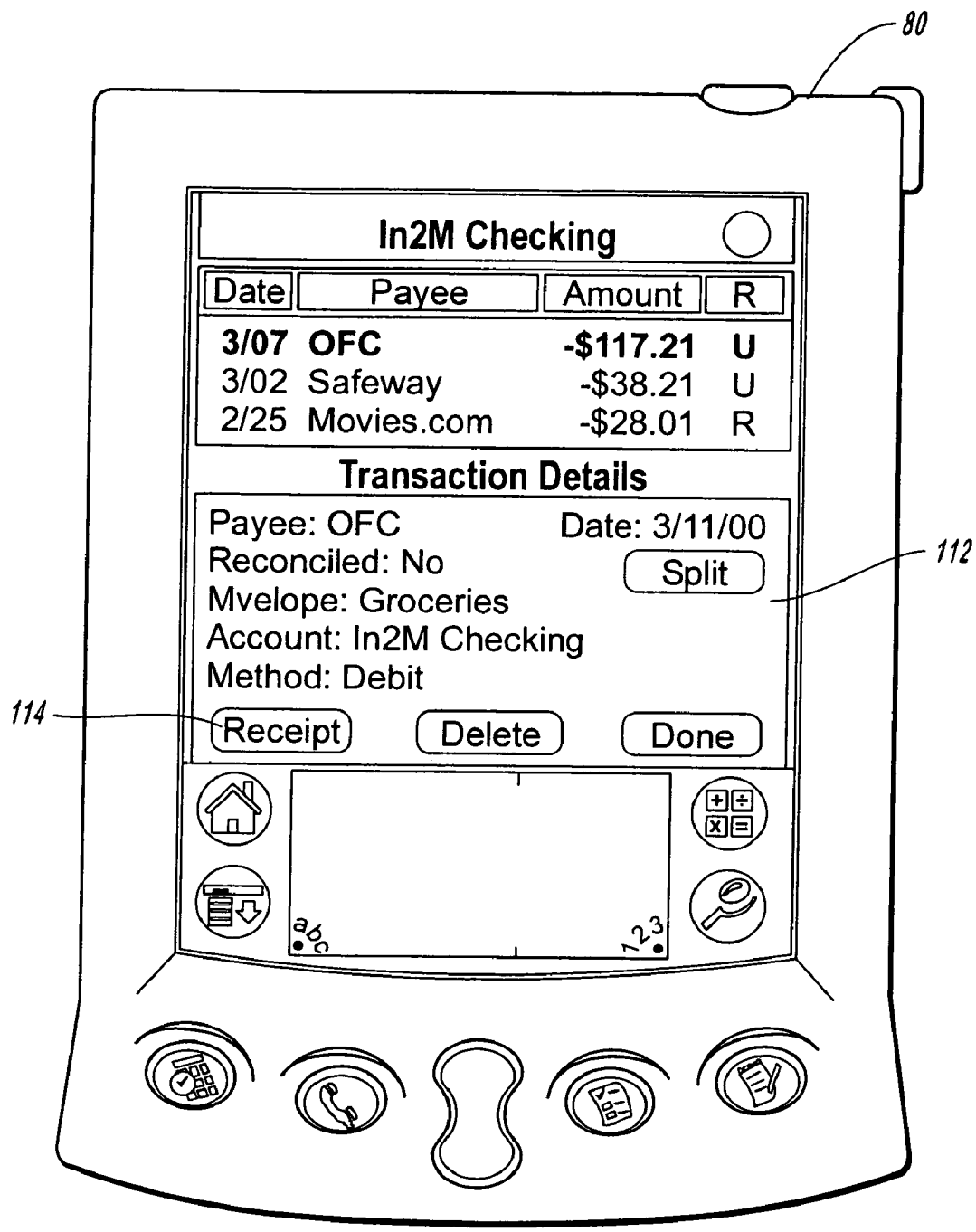
FIG. 6 illustrates an information window of transaction details of a transaction selected in the money envelope window of FIG. 5 in accordance with the present invention.

FIG. 6 illustrates a detail screen 112 of the details for a transaction selected from FIG. 5. The information includes the payee name, the date of the transaction, whether the transaction has been reconciled with the main account, what money envelope it belongs to, from which account the payment is actually made, and the method of payment, such as debit card, credit card, check, money order, or cash. These details can provide an electronic receipt by selecting icon 114.

Figure 7:
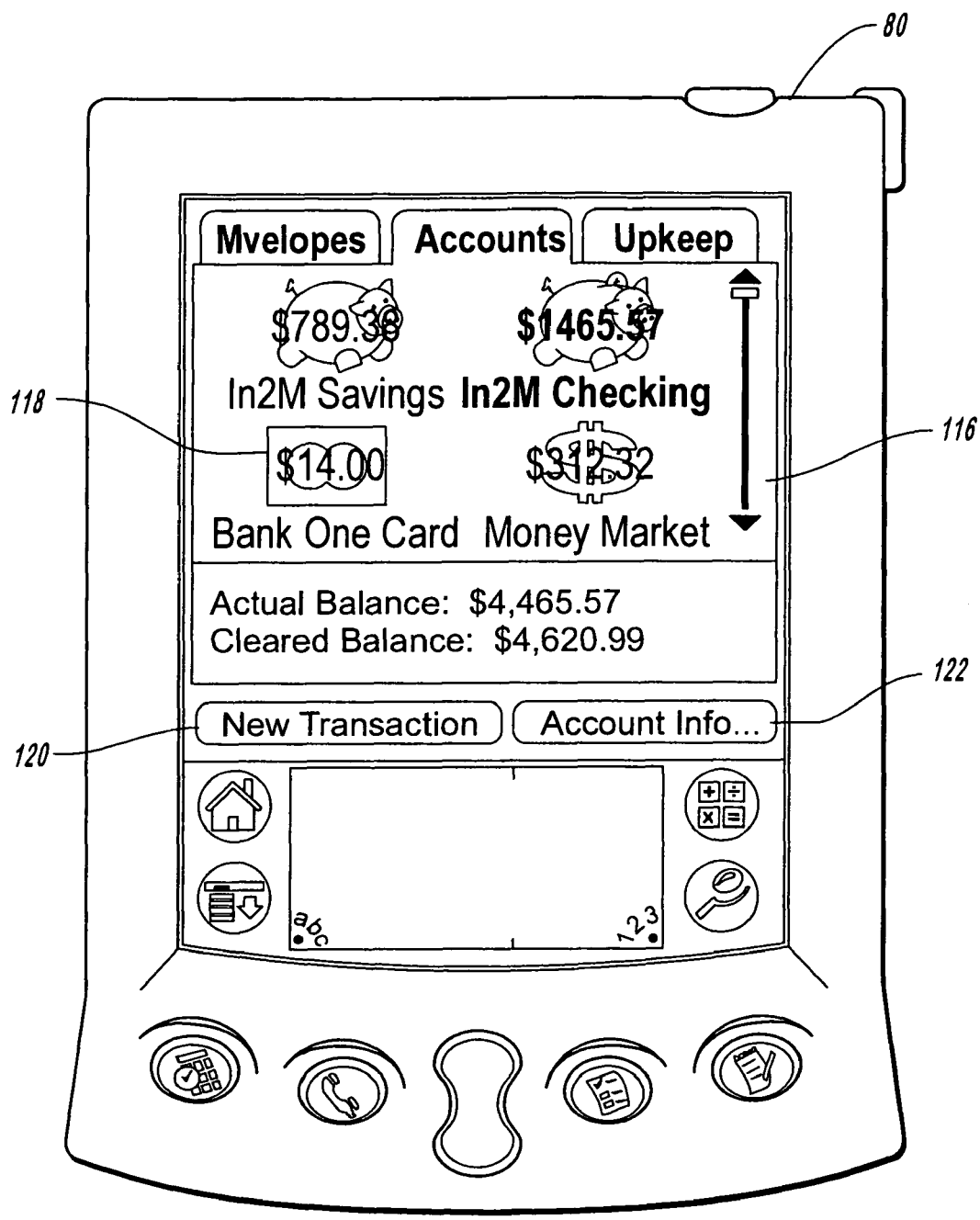
FIG. 7 depicts account information as selected in the account folder of FIG. 4.
Figure 8:
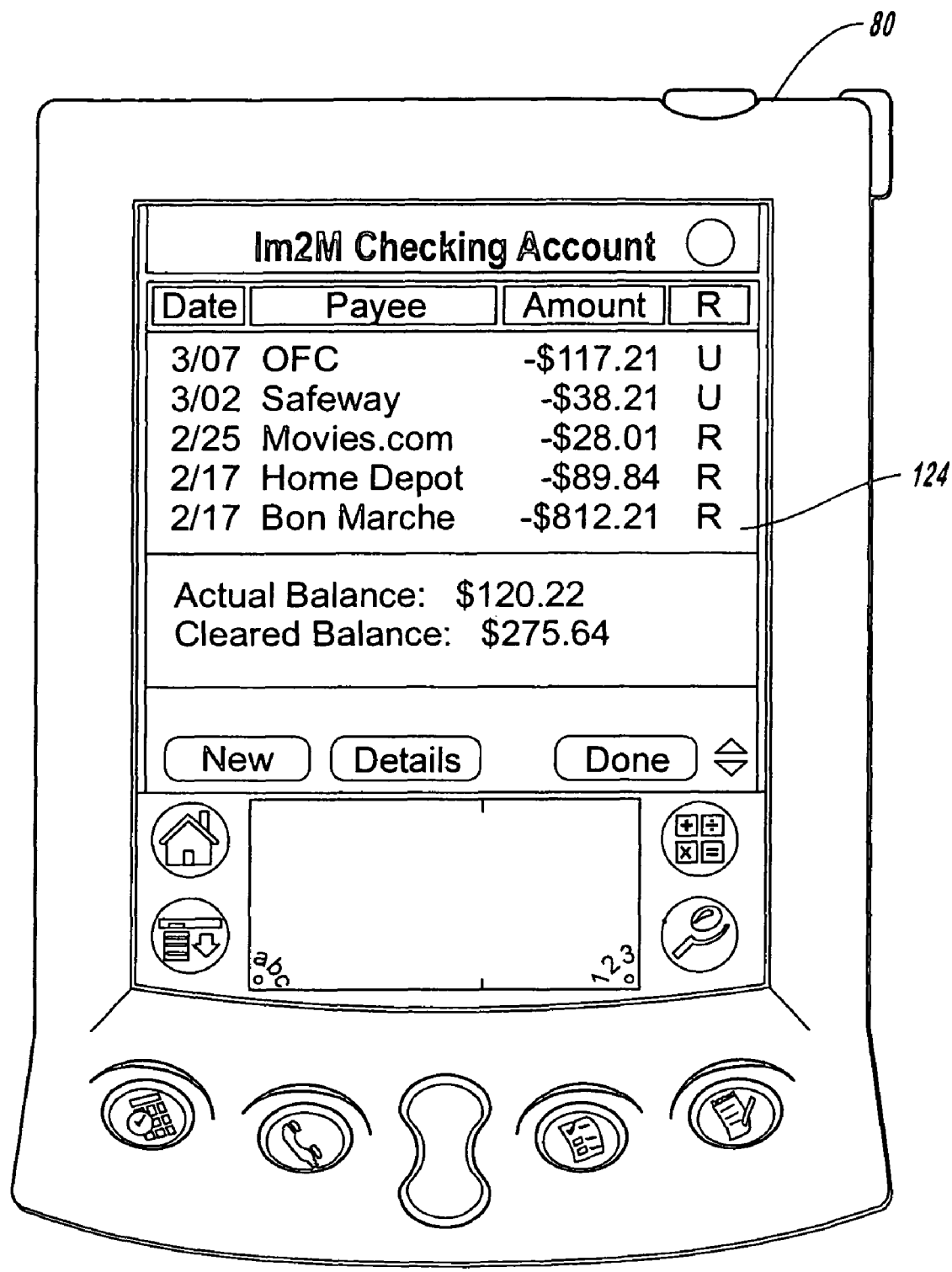
FIG. 8 is an illustration of an account information detail window as selected from FIG. 7.

If, in FIG. 4, the user selects the Account folder, screen 116 is displayed as shown in FIG. 7. Screen 116 displays information regarding each account the user has established in the form of an account icon that includes the current remaining balance within each account. Should the user select a given account, the actual and cleared balances are displayed below the account icon field 118. The user can enter new transactions or account information for a desired account via transaction icon 120 or account information icon 122. FIG. 8 illustrates a screen 124 of account detail information for a selected account. For this example, the checking account has been selected and various transactions are displayed and can be selected for additional details. Again, the date, payee name, amount, and reconciliation information are provide for the user's benefit.

Figure 9:
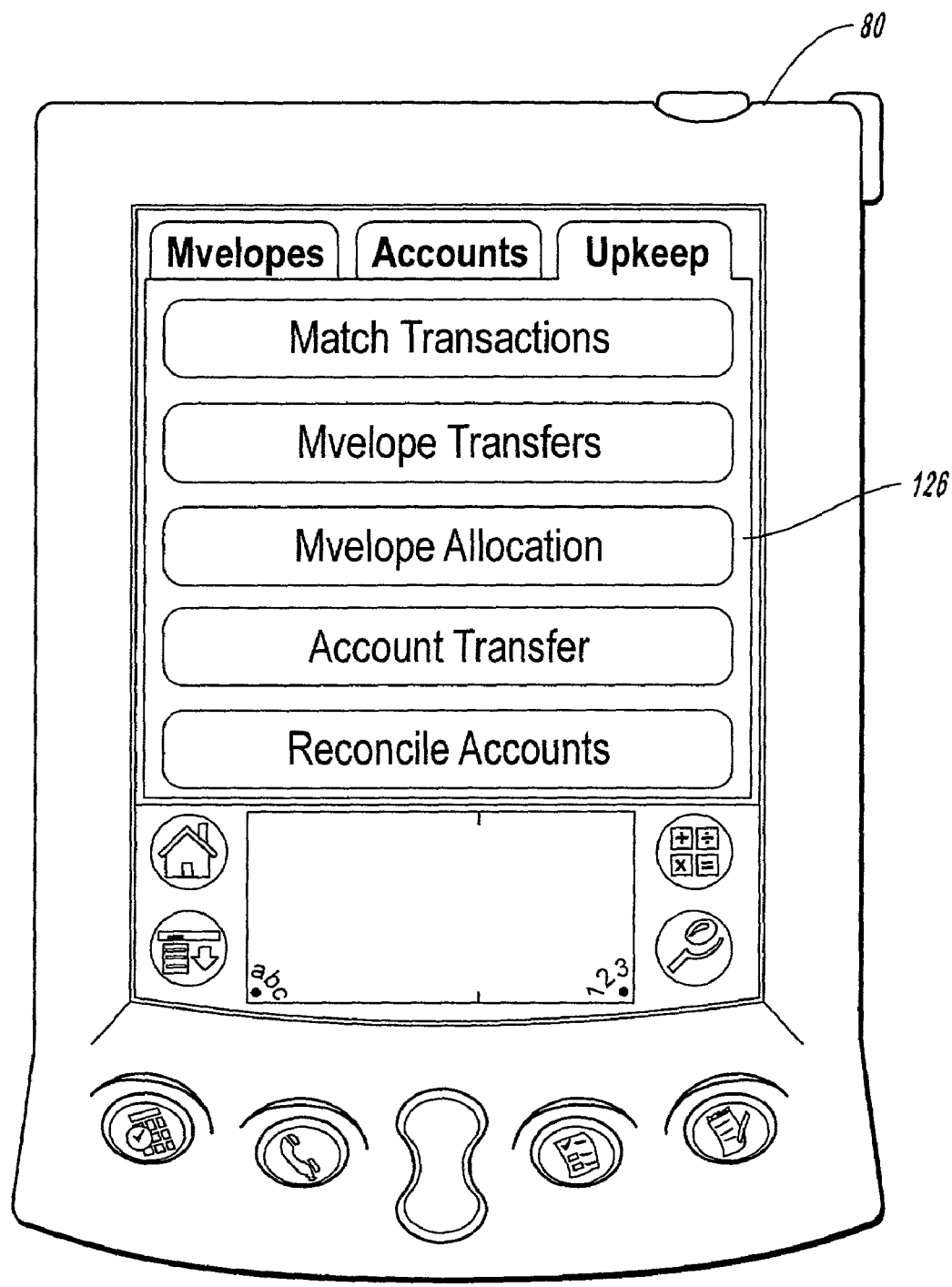
FIG. 9 depicts an upkeep information window as selected in FIG. 4 in accordance with the present invention.

FIG. 9 illustrates the upkeep folder screen 126, as selected in FIG. 4. Within the upkeep folder are the options of accepting, allocating, and matching incoming transactions, performing transfers of excess cash from one money envelope to one or more other money envelopes as desired. Further, the upkeep options allow the user to transfer cash from one account to another and to perform account reconciliation.

Other options included in this accounting system include report generation. These reports can be based upon the user's request to see transactions by envelopes, by payee, to see a cash flow statement, as well as to provide reconciliation reports between the account statement from the financial institution and the user's personal register. Further, the system can generate a budgetary report showing the spending status for each of the accounts. Additionally, a retirement calculator that allows the user to project future value of amounts given on certain interest rates can be produced. Lastly, the reports can include different expense accounts for any particular account or for the entire system as a whole.

The present invention may be embodied in other specific forms without departing from its spirit or essential characteristics. For example, additional implementations are presented in the Appendix section. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A forward-looking method for budgeting financial resources in an automated fashion to provide a running balance for real-time categorical financial decision making across a plurality of financial accounts, the method comprising:

establishing a plurality of virtual financial accounts corresponding to budgetary categories overlaid upon an actual financial account using a processor device running computer language instruction sets stored on a computer readable medium;

allocating portions of a budget to each of the plurality of virtual financial accounts using the processor device;

automatically using a third-party Internet-connected gateway to repeatedly access a plurality of financial institutions and to repeatedly search on-line credit card account and on-line checking account records of a plurality of actual financial accounts maintained by the plurality of financial institutions for recent purchases; and aggregating the search results using the gateway and displaying the search results over the Internet to a local processor device viewable by a user to show the user the updated status of a virtual account before making a purchasing decision.

2. An apparatus used to manage financial resources in a forward-looking automated fashion to assist in real-time categorical financial decision making across a plurality of financial accounts comprising:

means for establishing a plurality of virtual financial accounts overlaid upon a plurality of actual financial accounts, wherein at least one virtual financial account is overlaid upon multiple actual financial accounts and wherein multiple virtual financial accounts are overlaid upon one actual financial account;

means for allocating a given amount of funding for each of the plurality of virtual financial accounts prior to the advent of any financial transactions from each of the actual financial accounts upon which each virtual financial account is overlaid establishing fixed budgets for each of the virtual accounts over a specified period of time;

an Internet-connected gateway for repeatedly and regularly accessing and searching recent credit card and on-line checking account records over the Internet from a plurality of actual financial accounts at a plurality of financial institutions without a user request for the access and search aggregating and presenting the search results to a user to show the user the updated status of a virtual account;

means for allocating a transaction to a virtual financial account selected from the plurality of virtual financial accounts, the transaction corresponding to a debit from or credit to at least one of the actual financial accounts upon which the virtual financial account selected is overlaid; and means for debiting or crediting the allocated fund amount as the transaction is obtained from the financial institutions by the gateway according to the transaction allocated to the particular virtual financial account and from the at least one corresponding actual financial account.

3. The apparatus according to claim 2, further comprising means for determining a balance within each of the plurality of virtual financial accounts.

4. The apparatus according to claim 3, further comprising means for displaying the balance of a virtual financial account after transaction allocation.

5. The apparatus according to claim 2, further comprising means for distinguishing between transactions that have cleared real time through the actual financial account and those that have not within each of the plurality of virtual financial accounts.

6. The apparatus according to claim 2, further comprising means for displaying transaction information of a selected allocated transaction within one of the virtual financial accounts.

7. A forward-looking method for managing financial resources in an automated fashion for real-time categorical financial decision making across a plurality of actual financial accounts comprising:
   establishing a plurality of virtual financial accounts prior to the advent of any financial transactions overlaid upon at least one actual financial account using a processor device running computer language instructions stored on a computer readable medium;
   allocating a given amount of funding for each of the plurality of accounts using the processor device establishing fixed budgets for each of the virtual accounts;
   using communications gateway to access a plurality of financial institutions and to search on-line records of the plurality of financial institutions representing a plurality of actual accounts for purchases on credit card or other financial instruments;
   allocating transactions to an account selected from the plurality of virtual accounts; and
   automatically debiting or crediting the allocated fund amount according to the transactions allocated to the particular account and from the actual financial account as the transactions are obtained by the gateway; and
   presenting to a user a status of the updated virtual account prior to the user making a purchasing decision.

8. A forward-looking method for budgeting financial resources in an automated fashion for real-time categorical financial decision making across a plurality of actual financial accounts comprising:
   establishing a plurality of virtual financial accounts prior to the advent of any financial transactions overlaid upon an actual financial account using a processor device running computer language instructions stored on a computer readable medium establishing fixed budgets for each of the virtual financial accounts over a specified period of time;
   automatically periodically searching online financial records maintained by a plurality of financial institutions using an Internet-connected gateway for transactions made on a plurality of a user's credit cards and notifying the user of the transactions as record of the transactions are obtained from the financial institutions;
   allocating a given amount of budget for each of the plurality of accounts;
   allocating transactions to a virtual account corresponding to the type of transaction using the processor device;
   automatically debiting the virtual account according to the transaction amount immediately after the transaction has been allocated to a virtual account and crediting the virtual account when funds become available.

9. A forward-looking method for budgeting financial resources in an automated fashion to provide a running balance for real-time categorical financial decision making across a plurality of actual financial accounts, the method comprising:
   establishing a plurality of virtual financial accounts corresponding to budgetary categories overlaid upon an actual financial account using a processor device running computer language instructions stored on a computer readable medium;
   allocating portions of a budget to each of the plurality of accounts using the processor device prior to the advent of any financial transactions;
   establishing fixed budgets for each of the virtual accounts over a specified period of time;
   automatically periodically searching online financial records maintained by a plurality of financial institutions using an Internet-connected gateway for transactions made on a plurality of a user's credit cards and notifying the user of the transactions prior to the user making a purchasing decision;
   notifying a user over the Internet when a purchase on a credit card or other financial instrument has been made as records of the transactions are obtained by the gateway;
   allocating transactions to a virtual account corresponding to the type of transaction;
   automatically debiting the virtual account according to the transaction amount immediately after the transaction has been allocated to a virtual account and crediting the virtual account when funds become available when a new budgetary period begins.

* * * * *